United States Patent
Sawada et al.

(10) Patent No.: US 10,836,035 B2
(45) Date of Patent: Nov. 17, 2020

(54) OPERATION CONTROL DEVICE FOR MOVABLE APPARATUS, OPERATION CONTROL SYSTEM, AND METHOD OF CONTROLLING OPERATIONS BY MOVABLE APPARATUS

(71) Applicant: OKURA YUSOKI KABUSHIKI KAISHA, Hyogo (JP)

(72) Inventors: Hideki Sawada, Hyogo (JP); Toshiyuki Sato, Hyogo (JP); Tatsuo Onoyama, Hyogo (JP); Ryoichi Okura, Hyogo (JP); Mugen Kawazu, Osaka (JP)

(73) Assignee: OKURA YUSOKI KABUSHIKI KAISHA, Hyogo (JP)

( * ) Notice: Subject to any disclaimer, the term of this patent is extended or adjusted under 35 U.S.C. 154(b) by 291 days.

(21) Appl. No.: 15/766,493

(22) PCT Filed: Oct. 7, 2015

(86) PCT No.: PCT/JP2015/078506
§ 371 (c)(1),
(2) Date: Apr. 6, 2018

(87) PCT Pub. No.: WO2017/060989
PCT Pub. Date: Apr. 13, 2017

(65) Prior Publication Data
US 2018/0297201 A1 Oct. 18, 2018

(51) Int. Cl.
*B25J 19/06* (2006.01)
*B25J 13/06* (2006.01)
(Continued)

(52) U.S. Cl.
CPC ............ *B25J 9/1628* (2013.01); *B25J 9/126* (2013.01); *B25J 9/1676* (2013.01); *B25J 9/1694* (2013.01);
(Continued)

(58) Field of Classification Search
CPC ....................................................... B25J 9/16
See application file for complete search history.

(56) References Cited

U.S. PATENT DOCUMENTS

2004/0061466 A1   4/2004  Hashimoto et al.
2005/0055134 A1*  3/2005  Okuda .................. B25J 9/1666
                                                                    700/245
(Continued)

FOREIGN PATENT DOCUMENTS

CN          1496795          5/2004
CN          101147104        3/2008
(Continued)

OTHER PUBLICATIONS

English translation of International Search Report from related PCT application No. PCT/JP2015/078506, dated Nov. 17, 2015.
(Continued)

*Primary Examiner* — Kira Nguyen
(74) *Attorney, Agent, or Firm* — Barnes & Thornburg LLP; Jeffrey R. Stone

(57) ABSTRACT

A drive control device activates at least one of a plurality of operation regions and restricts operations by a robot such that the robot operates within the activated operation region. With a plurality of operation regions such as an operation region 1 and an operation region 2 being activated, when the drive control device predicts that the robot will be included in a range of any of the operation region 1 and the operation region 2, the drive control device does not cut off supply of electric power to a servo amplifier, whereas when the drive control device predicts that the robot will be included in a range of neither of the operation region 1 and the operation region 2, the drive control device cuts off supply of electric power to the servo amplifier.

11 Claims, 10 Drawing Sheets

(51) Int. Cl.
 *B25J 9/16* (2006.01)
 *G05B 19/4061* (2006.01)
 *B25J 9/12* (2006.01)

(52) U.S. Cl.
 CPC .............. *B25J 13/06* (2013.01); *B25J 19/06* (2013.01); *G05B 19/4061* (2013.01); *G05B 2219/40202* (2013.01)

(56) References Cited

U.S. PATENT DOCUMENTS

| | | | |
|---|---|---|---|
| 2005/0231162 A1* | 10/2005 | Takenaka | B25J 19/005 320/114 |
| 2009/0030550 A1* | 1/2009 | Nagata | B25J 19/06 700/251 |
| 2010/0125361 A1 | 5/2010 | Mougin et al. | |
| 2010/0191372 A1 | 7/2010 | Nihei et al. | |
| 2010/0204829 A1* | 8/2010 | Karlsson | B25J 19/06 700/245 |
| 2011/0224826 A1* | 9/2011 | Maehara | B25J 9/1676 700/255 |

FOREIGN PATENT DOCUMENTS

| | | |
|---|---|---|
| CN | 102189552 | 9/2011 |
| EP | 2230054 | 9/2010 |
| EP | 2783815 | 10/2014 |
| JP | S60-195602 | 10/1985 |
| JP | 64-016395 | 1/1989 |
| JP | 2000006083 | 1/2000 |
| JP | 2003-275988 | 9/2003 |
| JP | 2007283450 | 11/2007 |
| JP | 2010-269419 | 12/2010 |
| JP | 2011152612 | 8/2011 |
| JP | 2011-212831 | 10/2011 |
| JP | 5271499 B | 8/2013 |

OTHER PUBLICATIONS

Japanese Office Action for Japanese Patent Application No. 2017-544116 and its English translation, dated Oct. 23, 2018.
Extended European Search Report, dated May 31, 2019, in European Patent Application 15905809.8.
Office Action issued by the Chinese Patent Office for Application No. 201580083560.0, dated Aug. 19, 2020. English translation included.

* cited by examiner (a)

MONITORED REGION (b)

WARNING REGION

MONITORED REGION

OPERATION CONTROL DEVICE FOR MOVABLE APPARATUS, OPERATION CONTROL SYSTEM, AND METHOD OF CONTROLLING OPERATIONS BY MOVABLE APPARATUS

TECHNICAL FIELD

The present invention relates to an operation control device for a movable apparatus, an operation control system, and a method of controlling operations by a movable apparatus and particularly to an operation control device for a movable apparatus to be driven by a drive apparatus controlled by a drive control device, an operation control system including a movable apparatus, a drive control device, and an operation control device, and a method of controlling operations by a movable apparatus to be driven by a drive apparatus controlled by a drive control device.

BACKGROUND ART

A control device which has a movable apparatus such as an industrial robot operate within a prescribed operation region has conventionally been known.

For example, Japanese Patent No. 5271499 (PTD 1) discloses a control device which has a robot operate in an operation region set by an operator and cuts off supply of electric power to the robot when the robot moves out of the operation region. Since the control device restricts operations by the robot such that the robot operates in the operation region set by the operator, the robot does not run out of control due to a malfunction and the operator can safely proceed with operations outside the operation region.

CITATION LIST

Patent Document

PTD 1: Japanese Patent No. 5271499

SUMMARY OF INVENTION

Technical Problem

Depending on contents of operations, efficiency in operations may be higher when the robot operates over a plurality of operation regions than when the robot is limited to operate in a single operation region. In an attempt to allow a robot to operate over a plurality of operation regions, however, a region where operations by the robot should be restricted becomes larger and therefore it becomes difficult to ensure safety of an operator. Though the control device disclosed in PTD 1 addresses operations by a robot in a single operation region, it fails to address operations by the robot over a plurality of operation regions. Therefore, with the control device disclosed in PTD 1, improvement in efficiency in operations by the movable apparatus while safety is ensured has not been achieved.

The present invention was made in view of the problems above and an object thereof is to provide an operation control device for a movable apparatus, an operation control system, and a method of controlling operations by a movable apparatus which can improve efficiency in operations by the movable apparatus while safety is ensured.

Solution to Problem

The present invention is directed to an operation control device for a movable apparatus to be driven by a drive apparatus controlled by a drive control device. The operation control device includes an activation unit and an operation control unit. The activation unit activates at least one of a plurality of operation regions in which the movable apparatus can operate. The operation control unit restricts operations by the movable apparatus such that the movable apparatus operates within an activated region which is an operation region activated by the activation unit. The operation control unit is configured, when a first operation region and a second operation region included in the plurality of operation regions have been activated by the activation unit, not to cut off supply of electric power to the drive apparatus when the operation control unit predicts that the movable apparatus will be included in a range of any of the first operation region and the second operation region, and to cut off supply of electric power to the drive apparatus when the operation control unit predicts that the movable apparatus will be included in a range of neither of the first operation region and the second operation region.

According to the operation control device, operations by the movable apparatus are restricted such that the movable apparatus operates within at least one of the plurality of operation regions. Since the movable apparatus can operate not only in a single operation region but also in a plurality of operation regions, operations can efficiently be performed by the movable apparatus. Even while a plurality of operation regions such as the first operation region and the second operation region are activated, when it is predicted that the movable apparatus will be included in a range of any of the first operation region and the second operation region, supply of electric power to the drive apparatus is not cut off, whereas when it is predicted that the movable apparatus will be included in a range of neither of the first operation region and the second operation region, supply of electric power to the drive apparatus is cut off. Therefore, an operator can safely proceed with operations outside a range of a combined region of the first operation region and the second operation region. Efficiency in operations by the movable apparatus can thus be improved while safety is ensured.

Preferably, the first operation region and the second operation region overlap each other. When at least one of the first operation region and the second operation region is set as the activated region, an overlapping region between the first operation region and the second operation region is also set as the activated region.

According to the operation control device, for example, such a disadvantage that, in spite of the first operation region having been set as the activated region, due to the second operation region overlapping with the first operation region not being set as the activated region, an overlapping region therebetween is not set as the activated region and supply of electric power to the drive apparatus is cut off is not caused.

Preferably, when the operation control unit predicts that the movable apparatus will move out of a range of the activated region while the movable apparatus moves through inertia due to cut-off of supply of electric power to the drive apparatus, the operation control unit cuts off supply of electric power to the drive apparatus.

According to the operation control device, in consideration of movement of the movable apparatus through inertia when supply of electric power to the drive apparatus is cut off, the movable apparatus will not move out of the range of the activated region. Therefore, the operator can safely proceed with operations outside the activated region.

Preferably, the operation control device further includes a warning region setting unit. The warning region setting unit sets a prescribed warning region within a range of the activated region. When the movable apparatus moves out of a range of the warning region, the operation control unit has the drive control device control the drive apparatus by outputting a stop signal to the drive control device so as to stop the movable apparatus.

According to the operation control device, when the movable apparatus moves out of the warning region, the movable apparatus is braked and stopped under the control of the drive apparatus by the drive control device. Therefore, cut-off of supply of electric power to the drive apparatus by the operation control device can be avoided in advance.

Preferably, the operation control device further includes an entry detection unit. The entry detection unit is configured to detect entry into the activated region from the outside. When the entry detection unit detects entry into the activated region from the outside, the operation control unit cuts off supply of electric power to the drive apparatus.

According to the operation control device, supply of electric power to the drive apparatus is cut off when entry into the activated region from the outside occurs. Therefore, for example, even when an operator enters the activated region, exposure of the operator to danger posed by the movable apparatus can be avoided.

Preferably, the entry detection unit is provided in a boundary portion between the first operation region and the second operation region. The entry detection unit does not detect entry from the outside when the first operation region and the second operation region are set as the activated regions.

According to the operation control device, such a disadvantage that, in spite of the first operation region and the second operation region having been set as the activated regions, the entry detection unit detects entry from one activated region into the other activated region and consequently supply of electric power to the drive apparatus is cut off is not caused.

Preferably, the operation control device includes a plurality of entry detection units, one of the plurality of entry detection units being associated with respective one of the plurality of operation regions. The operation control device further includes a detection activation setting unit which sets an entry detection unit by which detection of entry into the activated region from the outside is activated and an entry detection unit by which detection of entry into the activated region from the outside is deactivated, among the plurality of entry detection units.

According to the operation control device, detection by a desired entry detection unit of entry into the activated region from the outside can be activated or deactivated.

Preferably, the operation control device further includes a region activation setting unit which activates a plurality of operation regions, one of the plurality of operation regions being associated with respective one of a plurality of switches.

According to the operation control device, one of the plurality of switches is associated with respective one of the plurality of operation regions to be activated. Therefore, an operator can activate a desired operation region simply by changing a switch which the operator operates depending on contents of operations so that the movable apparatus operates within that operation region.

Preferably, the operation control device further includes a prohibited region setting unit which sets a prohibited region into which entry by the movable apparatus is prohibited. When the operation control unit predicts that the movable apparatus will enter a range of the prohibited region while the movable apparatus moves through inertia due to cut-off of supply of electric power to the drive apparatus, the operation control unit cuts off supply of electric power to the drive apparatus.

According to the operation control device, the movable apparatus does not enter the set prohibited region and hence an operator can safely proceed with operations within the prohibited region.

An operation control system according to the present invention includes the movable apparatus, the drive control device, and any operation control device described above.

According to the operation control system, with the movable apparatus, the drive control device, and the operation control device, efficiency in operations by the movable apparatus can be improved while safety is ensured.

The present invention is directed to a method of controlling operations by a movable apparatus to be driven by a drive apparatus controlled by a drive control device. The method includes an activation step and an operation control step. In the activation step, at least one of a plurality of operation regions in which the movable apparatus can operate is activated. In the operation control step, operations by the movable apparatus are restricted such that the movable apparatus operates within a range of an activated region which is an operation region activated in the activation step. The operation control step includes, when a first operation region and a second operation region included in the plurality of operation regions have been activated in the activation step, not cutting off supply of electric power to the drive apparatus when it is predicted that the movable apparatus will be included in a range of any of the first operation region and the second operation region and cutting off supply of electric power to the drive apparatus when it is predicted that the movable apparatus will be included in a range of neither of the first operation region and the second operation region.

According to the method of controlling operations, operations by the movable apparatus are restricted such that the movable apparatus operates within at least one of the plurality of operation regions. Since the movable apparatus can operate not only in a single operation region but also in a plurality of operation regions, operations can efficiently be performed by the movable apparatus. Even while a plurality of operation regions such as the first operation region and the second operation region are activated, when it is predicted that the movable apparatus will be included in a range of any of the first operation region and the second operation region, supply of electric power to the drive apparatus is not cut off, whereas when it is predicted that the movable apparatus will be included in a range of neither of the first operation region and the second operation region, supply of electric power to the drive apparatus is cut off. Therefore, an operator can safely proceed with operations outside a range of a combined region of the first operation region and the second operation region. Efficiency in operations by the movable apparatus can thus be improved while safety is ensured.

DESCRIPTION OF EMBODIMENTS

Figure 1:
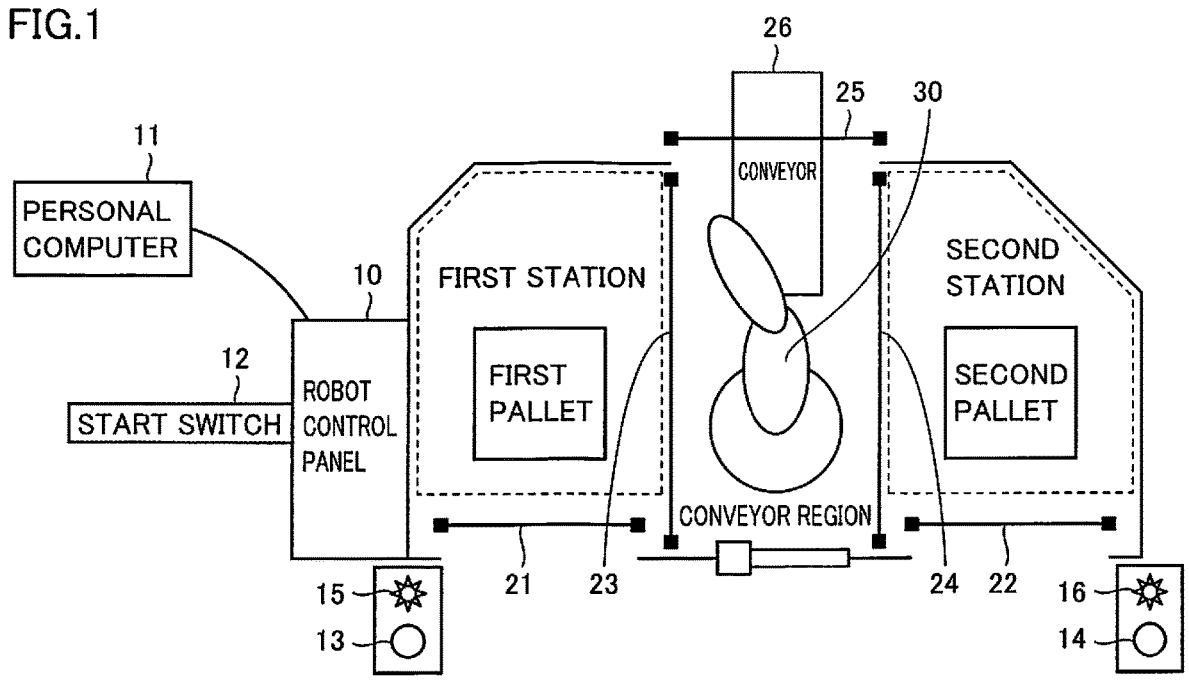
FIG. 1 is a diagram showing one example of a layout configuration in a factory where a robot operates.

An embodiment of the present invention will be described in detail with reference to the drawings. The same or corresponding elements in the drawings referred to have the same reference characters allotted and description thereof will not be repeated.

[Layout Configuration in Factory]

FIG. 1 is a diagram showing one example of a layout configuration in a factory where a robot 30 operates. A conveyor region is provided in the factory. In the conveyor region, a conveyor 26 which conveys objects to be conveyed is installed in the conveyor region. A first station and a second station are provided on opposing sides of the conveyor region. A first pallet on which objects conveyed by conveyor 26 are loaded by robot 30 is installed in the first station. A second pallet on which objects conveyed by conveyor 26 are loaded by robot 30 is installed in the second station.

Light curtains 21 to 25 are provided at a boundary between the first station and the outside, a boundary between the second station and the outside, a boundary between the first station and the conveyor region, a boundary between the second station and the conveyor region, and a boundary between the conveyor region and the outside, respectively. Light curtains 21 to 25 each include a light projector and a light receiver and detect whether or not light emitted from the light projector to the light receiver is cut off by an operator and an object such as a conveyed object.

According to such a configuration, light curtains 21 to 25 can detect entry or exit of an object into or out of a prescribed region. For example, light curtain 21 detects entry of an operator from the outside into the first station. Light curtain 23 detects entry of an operator from the first station into the conveyor region. Light curtains 21 to 25 correspond to one embodiment of the "entry detection unit."

A robot control panel 10 is placed around the first station. A plurality of devices for controlling robot 30 are incorporated in robot control panel 10. A start switch 12, loading start switches 13 and 14, loading completion indicators 15 and 16, and a personal computer 11 for setting are connected to robot control panel 10 through lines (which are not shown).

Start switch 12 is a switch operated when an operator starts up robot 30. Loading start switches 13 and 14 are switches operated when an operator operates robot 30 to have the robot load objects conveyed by the conveyor on a pallet. Loading completion indicators 15 and 16 are indicators which notify an operator of completion of loading operations by robot 30 by illuminating or blinking. Start switch 12 and loading start switches 13 and 14 correspond to one embodiment of the "plurality of switches."

[Mechanical Construction of Robot]

Figure 2:
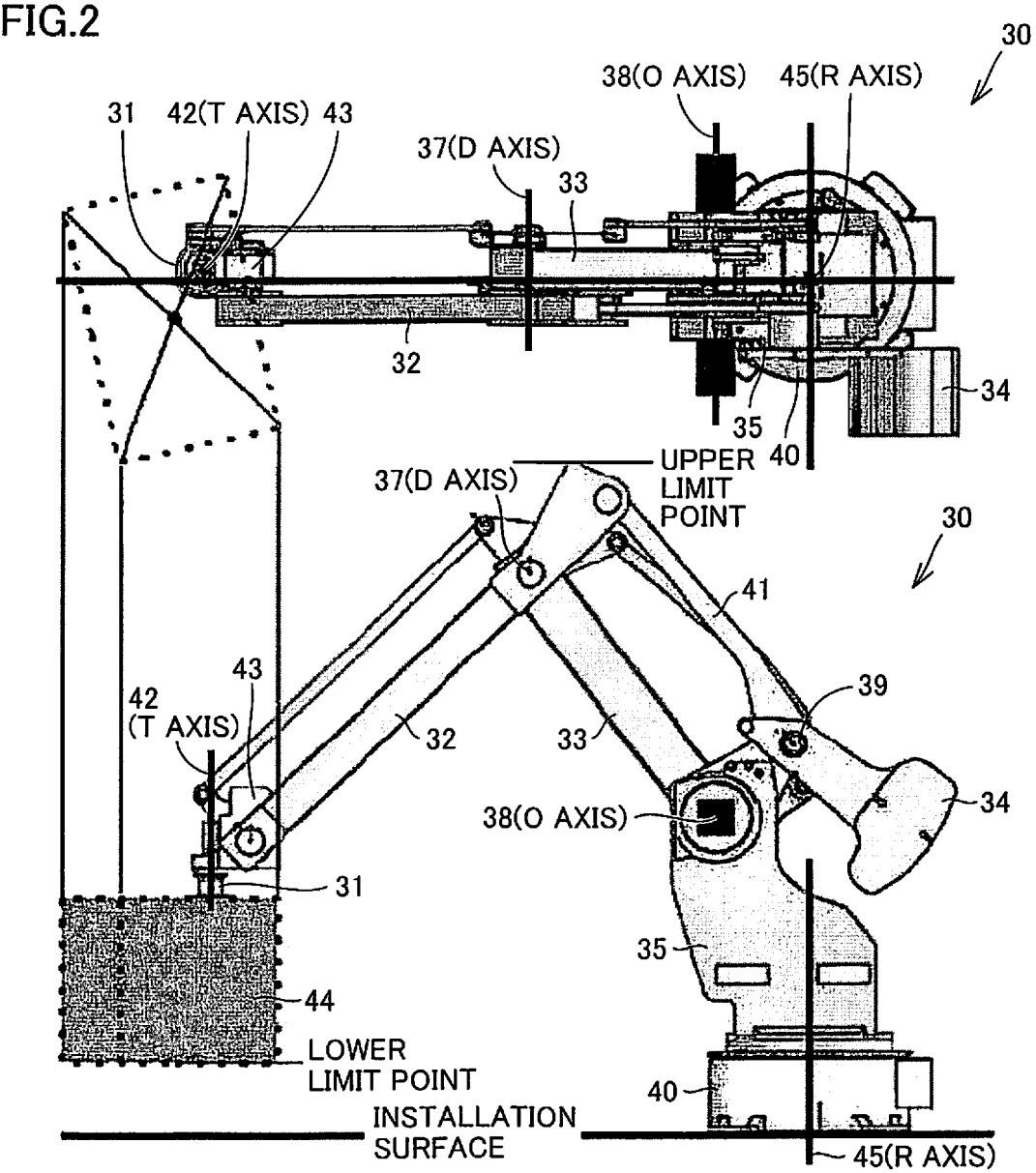
FIG. 2 is a diagram showing a mechanical construction of the robot viewed from above and laterally.

FIG. 2 is a diagram showing a mechanical construction of robot 30 viewed from above and laterally. The mechanical construction of robot 30 shown in FIG. 2 is by way of example and the robot may be a robot mechanically constructed otherwise.

Robot 30 in the present embodiment includes a cylindrical installation stage 40 fixed to an installation surface, a main body portion 35 provided on an upper surface of installation stage 40, a lower arm 33 connected to main body portion 35, a support arm 41 connected to main body portion 35 together with lower arm 33, a weight 34 connected to support arm 41, an upper arm 32 connected to lower arm 33 and support arm 41, a link 43 connected to upper arm 32, a tool 31 connected to link 43, and an end effector 44 provided at a tip end of tool 31. A shape of end effector 44 is shown in a simplified manner in FIG. 2.

Main body portion 35 is connected to a shaft of a motor 71 which will be described later (a motor shaft along an axis 45) attached to installation stage 40. Lower arm 33 is connected to a shaft of motor 71 (a motor shaft along an axis 38) attached to main body portion 35. Upper arm 32 is connected to a shaft of motor 71 (a motor shaft along an axis 37) attached to support arm 41. Tool 31 is connected to a shaft of motor 71 (a motor shaft along an axis 42) attached to link 43. Each motor 71 is not shown.

In the following, for the sake of convenience of description, axis 45, axis 38, axis 37, and axis 42 are referred to as an R axis, an O axis, a D axis, and a T axis, respectively. Lower arm 33 and upper arm 32 are also simply referred to as an arm.

Main body portion 35 rotates around the R axis with rotation of the motor shaft. With rotation of main body portion 35, the arm and end effector 44 move in parallel to the installation surface.

Lower arm 33 pivots around the O axis with rotation of the motor shaft. Upper arm 32 pivots around the D axis with rotation of the motor shaft. With pivot of lower arm 33 around the O axis or pivot of upper arm 32 around the D axis, end effector 44 moves toward or away from the R axis. For example, when lower arm 33 and upper arm 32 are closer to a state parallel to the installation surface, a distance between the R axis and end effector 44 is gradually longer, and when lower arm 33 and upper arm 32 are closer to a state perpendicular to the installation surface, a distance between the R axis and end effector 44 is gradually shorter.

Weight 34 mitigates loads applied to the O axis and the D axis. Though weight 34 is fixed to support arm 41 with a bolt 39, it moves with pivot of the arm.

Tool 31 rotates around the T axis with rotation of the motor shaft. With rotation of tool 31 around the T axis, end effector 44 rotates in parallel to the installation surface.

Robot 30 thus moves end effector 44 to a desired position and maintains the end effector in a desired posture by moving main body portion 35, the arm, and tool 31. End effector 44 can hold a conveyed cargo load and load the cargo load on a pallet. Robot 30 corresponds to one embodiment of the "movable apparatus."

[Overall Configuration of Operation Control System]

Figure 3:
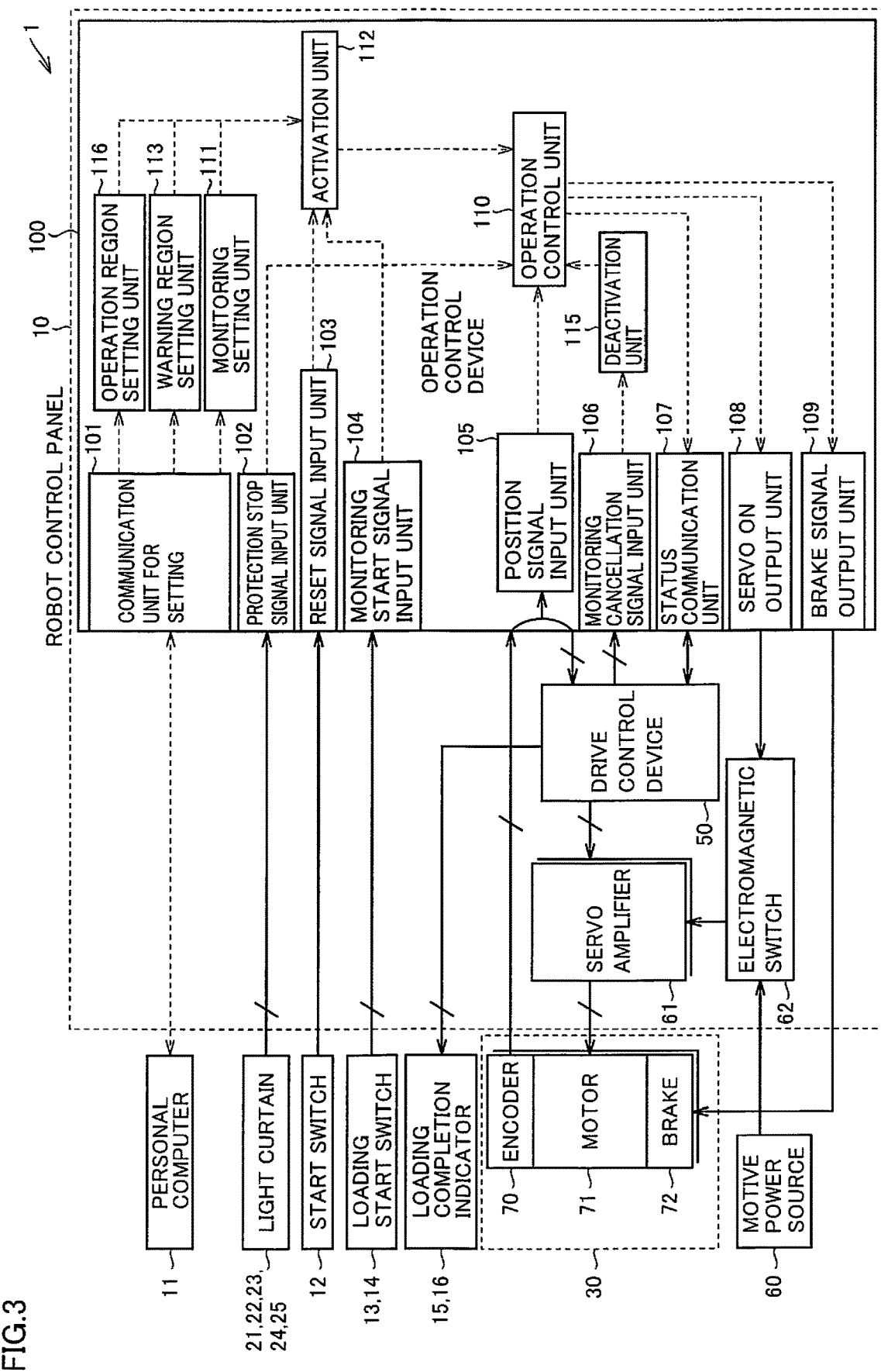
FIG. 3 is a diagram showing an overall configuration of an operation control system.

FIG. 3 is a diagram showing an overall configuration of an operation control system 1. Each shaft of robot 30 (the R axis, the 0 axis, the D axis, and the T axis) is provided with motor 71, an encoder 70, and a brake 72.

Motor 71 is, for example, a geared motor and rotates each shaft of robot 30. Encoder 70 detects a direction of rotation and an angle of rotation of each shaft of robot 30. Encoder 70 may be an absolute encoder which detects an angle of rotation of each shaft as an absolute value or an incremental encoder which detects an angle of rotation of each shaft as a value relative to a prescribed position. Brake 72 is, for example, a non-excitation electromagnetic brake. While brake 72 is not fed with power, each shaft of robot 30 is braked.

Robot control panel 10 includes an electromagnetic switch 62, a servo amplifier 61, a drive control device 50, and an operation control device 100.

As electromagnetic switch 62 is switched between on and off, a path between a motive power source 60 installed outside and servo amplifier 61 is closed or opened. For example, while electromagnetic switch 62 is turned on, a path between motive power source 60 and servo amplifier 61 is closed so that electric power from motive power source 60 is supplied to servo amplifier 61. While electromagnetic switch 62 is turned off, the path between motive power source 60 and servo amplifier 61 is opened so that supply of electric power from motive power source 60 to servo amplifier 61 is cut off. Electromagnetic switch 62 is switched between on and off by operation control device 100 which will be described later.

Servo amplifier 61 drives motor 71 based on a command from drive control device 50 to rotate each shaft. Servo amplifier 61 is activated with electric power from motive power source 60 supplied through electromagnetic switch 62. When electromagnetic switch 62 is turned off to cut off supply of electric power from motive power source 60, servo amplifier 61 is unable to drive motor 71. In this case, driving force and braking force from each motor 71 are not provided to each shaft of robot 30. Therefore, each shaft stops after it operates through inertia in what is called a freewheeling state. Servo amplifier 61 corresponds to one embodiment of the "drive apparatus." Motor 71 may have a function the same as the function of servo amplifier 61, and in this case, motor 71 corresponds to one embodiment of the "drive apparatus."

Drive control device 50 controls servo amplifier 61 to have servo amplifier 61 drive motor 71. Drive control device 50 gives a command about a rotation speed of the motor to servo amplifier 61 based on a program input by an operator. Drive control device 50 can thus have robot 30 operate by controlling servo amplifier 61 to have the servo amplifier drive motor 71. Drive control device 50 corresponds to one embodiment of the "drive control device."

Cooperation between robot 30 and an operator in the factory will be described with reference to FIGS. 1 and 2. When the operator operates start switch 12, a system of robot 30 is started up and set to be ready under the control by drive control device 50. When the operator operates loading start switch 13, robot 30 starts to load objects conveyed by conveyor 26 on the first pallet in the first station. While robot 30 operates in the first station, the operator stands by outside without entering the first station. As loading on the first pallet is completed, loading completion indicator 15 is turned on or blinks. Then, the operator enters the first station and carries the objects loaded on the first pallet to the outside.

Though robot 30 operates under motor control by drive control device 50, safety of operations by robot 30 may not be ensured under the control by drive control device 50. For example, in the example above, robot 30 may move out of the first station due to a malfunction of drive control device 50 while robot 30 is performing loading operations in the first station. Alternatively, when a detection value from encoder 70 obtained by drive control device 50 is erroneous, robot 30 may malfunction due to the control by drive control device 50. Introduction of a control system such as a safety programmable logic controller (PLC) into existing drive control device 50 can more reliably ensure safety. Modification to existing drive control device 50, however, is time consuming and also leads to increase in cost.

Therefore, operation control system 1 in the present embodiment is provided with operation control device 100 for ensuring safety, separately from drive control device 50. Operation control device 100 is externally attached to existing drive control device 50 through line connection. Operation control device 100 restricts operations by robot 30 such that robot 30 operates within a range of a monitored operation region (which is also referred to as a monitored region) in a region where robot 30 can operate (which is also referred to as an operation region).

The operation region is activated and monitored in response to an operation of start switch 12 or loading start switch 13, 14 by an operator. The operator selects an operation region to be activated (to be monitored) based on his or her determination. In the monitored region, operations by robot 30 are permitted by operation control device 100, and outside the monitored region, operations by robot 30 are prohibited by operation control device 100. With such restriction imposed by operation control device 100 on operations by robot 30 in the monitored region, the operator can safely proceed with operations outside the monitored region. Operation control device 100 corresponds to one embodiment of the "operation control device." The monitored region corresponds to one embodiment of the "activated region."

[Operation Region and Monitored Region]

Figure 4:
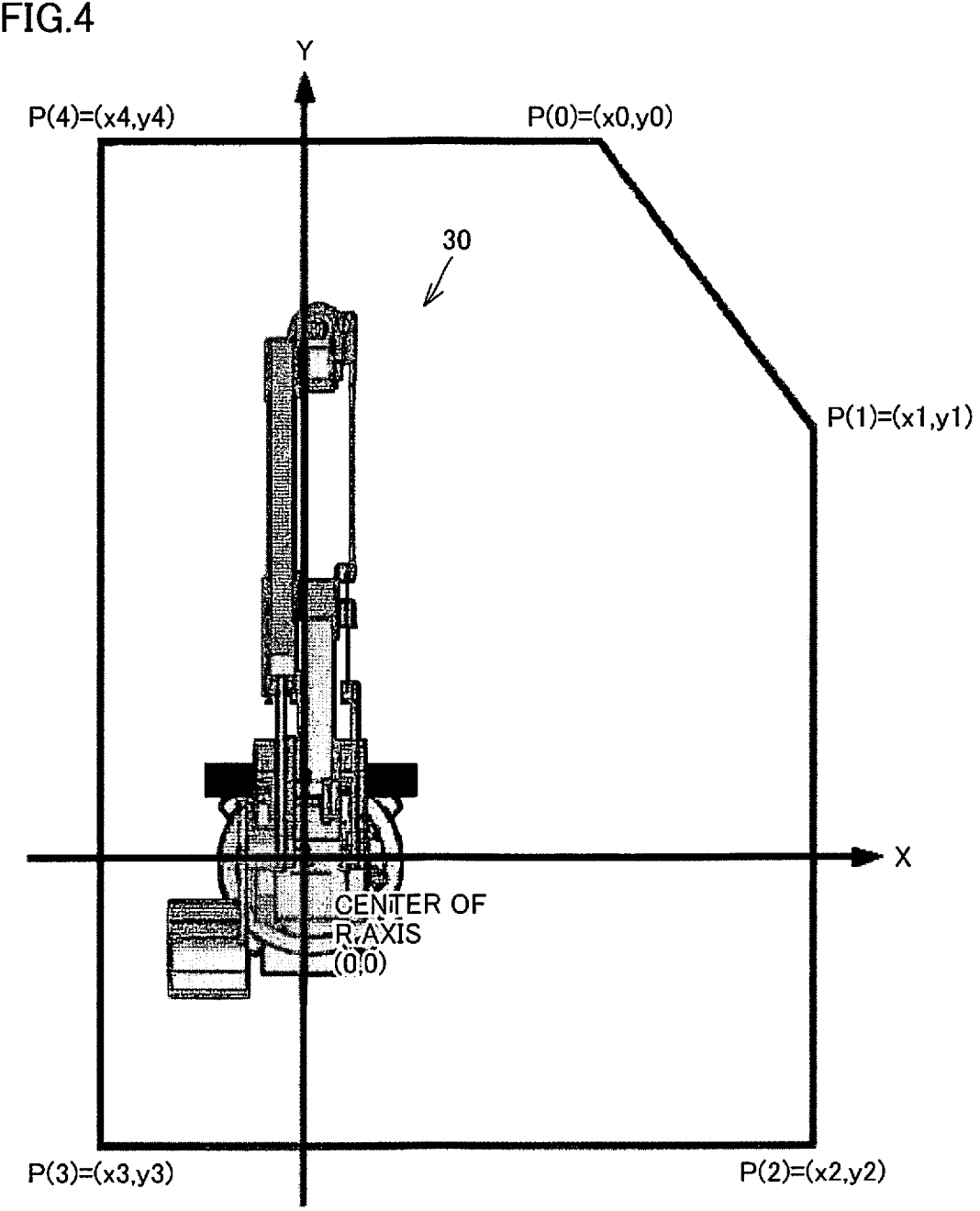
FIG. 4 is a diagram for illustrating one example of setting of an operation region.

The operation region and the monitored region will specifically be described with reference to FIG. 4. FIG. 4 is a diagram for illustrating one example of setting of an operation region. An operator can set in advance an operation region of robot 30 through personal computer 11 (see FIG. 3). The operator can set a single operation region and also a plurality of operation regions.

The operation region is set in a direction in parallel to the installation surface of robot 30. The operation region should be set to include the R axis of robot 30 without fail and it is set as a polygon having sixteen vertices at the maximum.

Specifically, the center of the R axis of robot 30 is set at (0, 0) on an X-Y coordinate and then each vertex expressed on the X-Y coordinate is set. For example, in the example shown in FIG. 4, after the center of the R axis is set at (0, 0) on the X-Y coordinate, P(0) is set at (X0, Y0) on the X-Y coordinate, P(1) is set at (X1, Y1) on the X-Y coordinate, P(2) is set at (X2, Y2) on the X-Y coordinate, P(3) is set at (X3, Y3) on the X-Y coordinate, and P(4) is set at (X4, Y4) on the X-Y coordinate. The operation region may be set to include other axes in addition to the R axis of robot 30 or may be set to include other axes without including the R axis. The operation region may be set with another number of vertices without being limited to sixteen points, and it may be set as a circle without being limited to a rectangle.

By thus arbitrarily setting the operation region, the operator can have robot 30 operate within an appropriate monitored region in accordance with contents of operations under the control by operation control device 100.

Depending on contents of operations, efficiency in operations may be higher when robot 30 operates over a plurality of operation regions than when the robot is limited to operate in a single operation region. For example, as in the layout shown in FIG. 1, operations for loading of objects by robot 30 may have to be performed in a plurality of stations such as the first station and the second station. In this case, the operator can achieve improved efficiency in operations if he or she can set an operation region including the first station and an operation region including the second station and then can have the robot operate over the plurality of operation regions.

In the present embodiment, the operator is allowed to set a plurality of operation regions without being limited to a single operation region.

Figure 5:
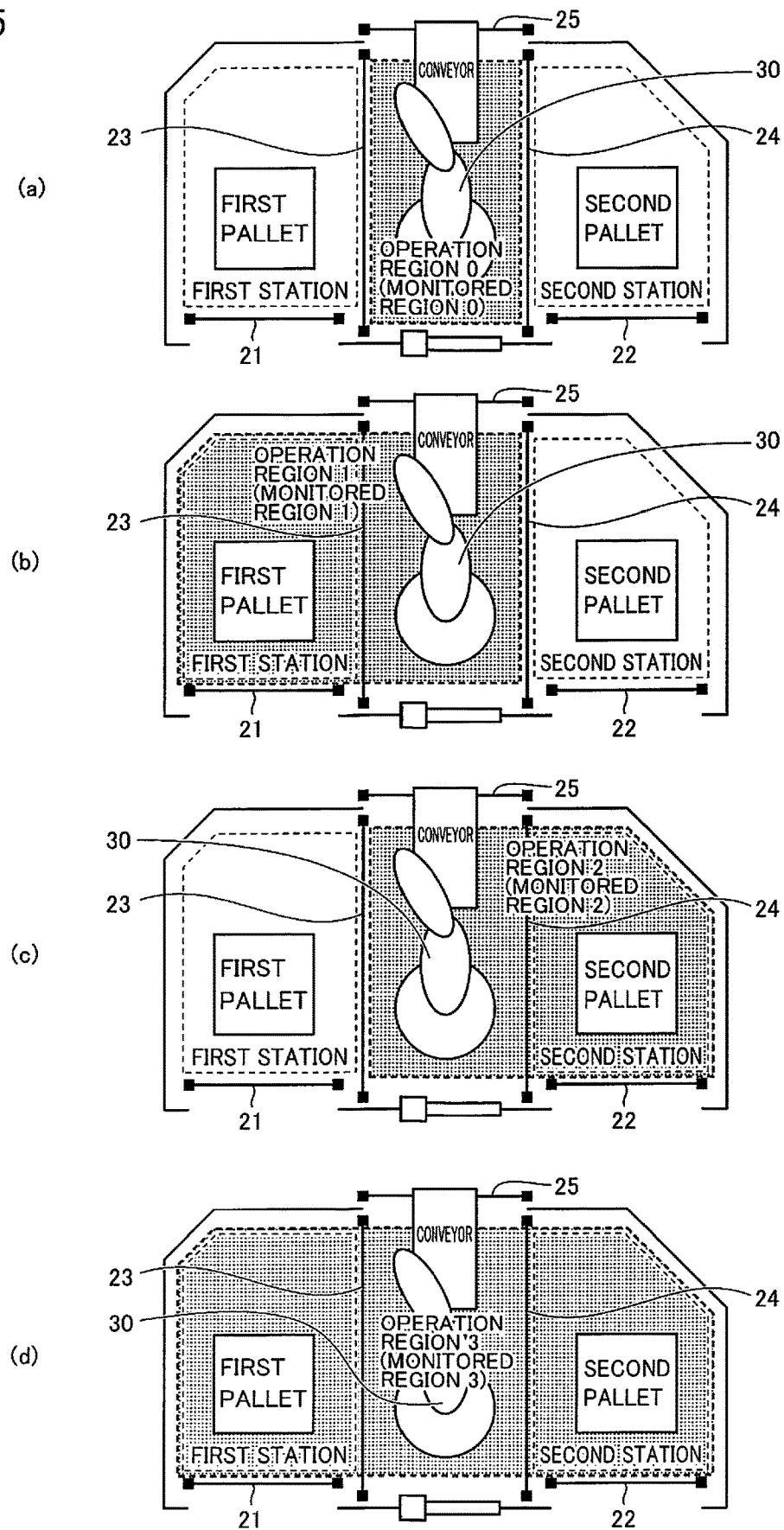
FIG. 5 is (a) a diagram for illustrating an operation region 0, (b) a diagram for illustrating an operation region 1, (c) a diagram for illustrating an operation region 2, and (d) a diagram for illustrating an operation region 3.

FIG. 5 is a diagram for illustrating four operation regions of an operation region 0 to an operation region 3. As shown in FIG. 5 (*a*), operation region 0 is a region for monitoring the conveyor region. Operation region 0 being monitored is referred to as a monitored region 0. As shown in FIG. 5 (*b*), an operation region 1 is a region for monitoring the conveyor region and a region including the first station. Operation region 1 being monitored is referred to as a monitored region 1. As shown in FIG. 5 (*c*), an operation region 2 is a region for monitoring the conveyor region and a region including the second station. Operation region 2 being monitored is referred to as a monitored region 2. As shown in FIG. 5 (*d*), operation region 3 is a region for monitoring the conveyor region and a region including the first station and the second station. Operation region 3 being monitored is referred to as a monitored region 3.

As shown in FIG. 5, a plurality of operation regions overlap each other. For example, operation region 0 and operation region 1 overlap each other in the conveyor region. Operation region 0 and operation region 2 overlap each other in the conveyor region. Operation region 0 and operation region 3 overlap each other in the conveyor region. Operation region 1 and operation region 2 overlap each other in the conveyor region. Operation region 1 and operation region 3 overlap each other in the conveyor region and the region including the first station. Operation region 2 and operation region 3 overlap each other in the conveyor region and the region including the second station. The reason why the conveyor region is included in each operation region is that robot 30 is installed in the conveyor region and the operation region is set to include the R axis of robot 30 without fail in the present embodiment.

Since robot 30 can thus operate within a range not only of a single operation region but also of a plurality of operation regions, operations can be performed efficiently by operations performed by robot 30.

[Restriction of Operations by Robot in Monitored Region]

Figure 6:
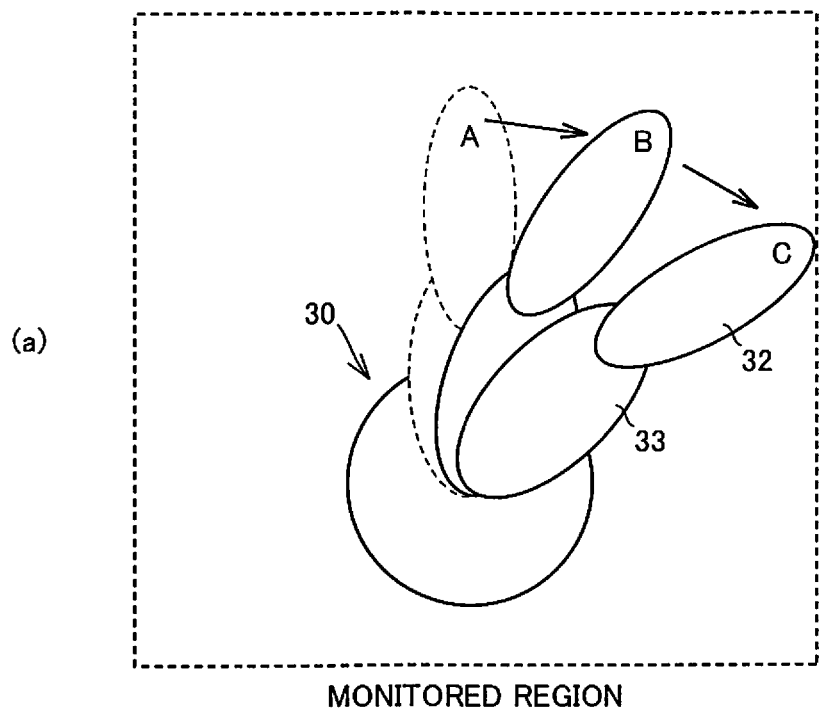
FIG. 6 is (a) a diagram for illustrating operations by the robot in a monitored region and (b) a diagram for illustrating operations by the robot when the robot moves out of a warning region.
Figure 6:
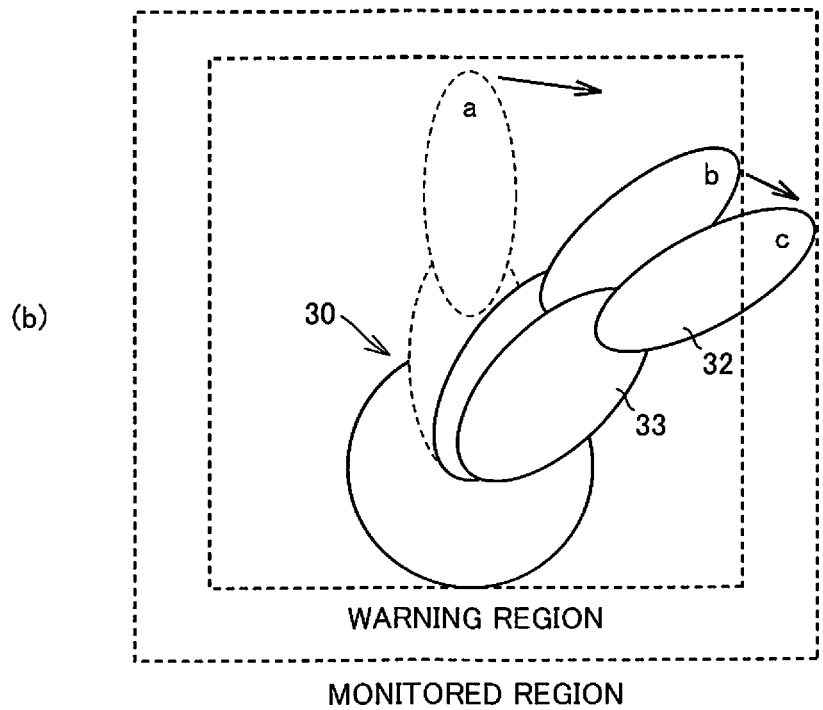

Restriction of operations by robot 30 in the monitored region will now be described with reference to FIGS. 6 (*a*) and 7. FIG. 6 (*a*) is a diagram for illustrating operations by the robot in the monitored region and FIG. 7 is a diagram in which each feature of the robot is modeled with a rectangle.

Figure 7:
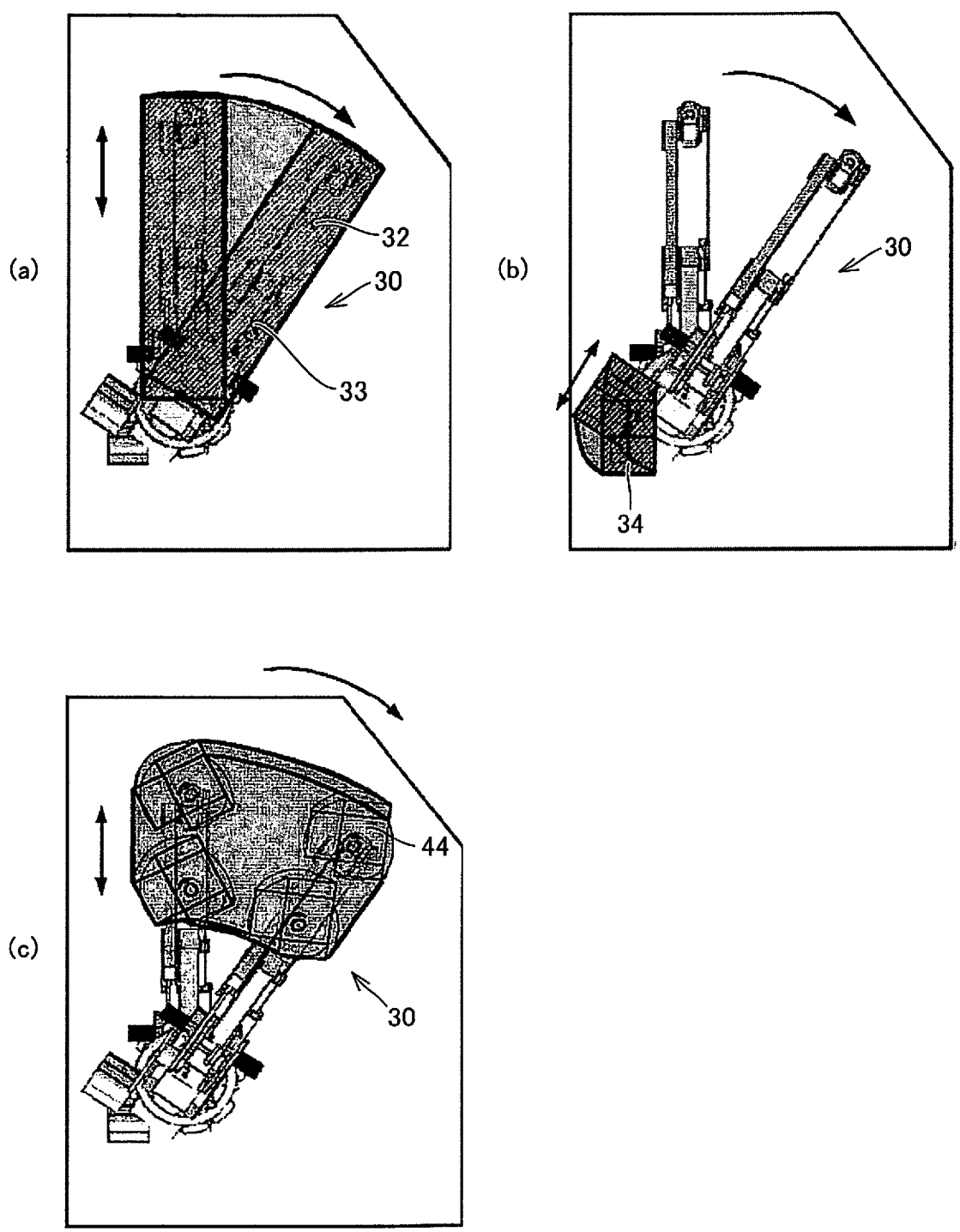
FIG. 7 is (a) diagram in which an arm of the robot is modeled with a rectangle, (b) a diagram in which a weight of the robot is modeled with a rectangle, and (c) a diagram in which an end effector of the robot is modeled with a rectangle.

As shown in FIG. 7, operation control device 100 models each element of robot 30 with a rectangle while robot 30 is operating under the control by drive control device 50 and predicts operations of each element. For example, as shown in FIG. 7 (*a*), operation control device 100 models the arm of robot 30 with a rectangle and predicts operations by the arm which revolves to the right. As shown in FIG. 7 (*b*), operation control device 100 models weight 34 with a rectangle and predicts operations by weight 34 which moves with revolution of the arm to the right. As shown in FIG. 7 (*c*), operation control device 100 models end effector 44 with a rectangle and predicts operations by end effector 44 which moves with revolution to the right and extension and contraction of the arm. Prediction of operations by each element includes prediction of a range of movement and a path of passage of each element.

Operation control device 100 calculates a direction of rotation and an angle of rotation of each shaft of robot 30 by using a detection value from encoder 70 at prescribed periodic intervals (for example, at 10-msec. intervals) while robot 30 (to be more exact, the arm, weight 34, and end effector 44 of robot 30) is operating under the control by drive control device 50. Operation control device 100 assumes an example in which electromagnetic switch 62 is turned off to cut off supply of electric power to servo amplifier 61 at prescribed periodic intervals.

Since driving force and braking force of the motor for each shaft of robot 30 are no longer applied when supply of electric power to servo amplifier 61 is cut off, each shaft rotates through inertia in what is called a freewheeling state. Even though supply of electric power to servo amplifier 61 is cut off, each shaft rotates through inertia so that robot 30 moves slightly from a position where supply of electric power is cut off.

Then, operation control device 100 predicts a stop position of robot 30 which may move owing to rotation of each shaft of robot 30 through inertia. A predicted position where robot 30 will stop is found based on an angle of rotation, a direction of rotation, and a speed of rotation of each shaft at the time point of cut-off of supply of electric power to servo amplifier 61.

Operation control device 100 finds out a line segment which connects each vertex of a modeled rectangle of robot 30 at a current position and each vertex of the modeled rectangle of robot 30 at a predicted position to each other. Operation control device 100 makes intersection determination using calculation of an outer product of vectors of each found line segment and a border line of the monitored region. When operation control device 100 determines in intersection determination of the line segment that any found line segment does not intersect with the border line of the monitored region, it determines that the predicted position of robot 30 is a position within the monitored region. When operation control device 100 determines in intersection determination of the line segment that any found line segment intersects with the border line of the monitored region, it determines that the predicted position of robot 30 is a position outside the monitored region. Since intersection determination of the line segment is a well-known technique, detailed description will not be provided.

Operation control device 100 thus predicts at prescribed periodic intervals, a position which robot 30 will reach as a result of movement through inertia when supply of electric power to servo amplifier 61 is cut off at a current position while robot 30 is operating and determines whether or not the predicted position is outside the monitored region. When operation control device 100 predicts that robot 30 will move out of the monitored region as the robot moves through inertia, it cuts off supply of electric power to servo amplifier 61.

For example, as shown in FIG. 6 (*a*), an example in which the arm of robot 30 revolves to the right from a position A in the monitored region is assumed. In this example, operation control device 100 predicts that robot 30 will move through inertia to a position C which is immediately before robot 30 moves out of the monitored region as a result of movement through inertia when supply of electric power to servo amplifier 61 is cut off based on determination made when the arm is located at a position B. If supply of electric power to servo amplifier 61 is cut off after the arm passes by position B, robot 30 is highly likely to move out of the monitored region as it moves through inertia. Therefore, operation control device 100 cuts off supply of electric power to servo amplifier 61 when the arm reaches position B. Thus, even though the arm moves through inertia, it stops at position C which is immediately before the arm moves out of the monitored region.

[Warning Region]

A warning region will now be described. FIG. 6 (*b*) is a diagram for illustrating operations by robot 30 when the robot moves out of a warning region. An operator can set in advance a warning region within the monitored region through personal computer 11. The warning region can be set with a method similar to setting of an operation region described with reference to FIG. 4.

As described previously, operation control device 100 cuts off supply of electric power to servo amplifier 61 before robot 30 moves out of the monitored region. Once supply of electric power to servo amplifier 61 is cut off, however, recovery operations are time consuming and bothersome to an operator. Furthermore, automatic operations by robot 30 under the control by drive control device 50 are interrupted and productivity is lowered. Therefore, operation control device 100 outputs a stop signal for braking and stopping robot 30 to drive control device 50 when robot 30 moves out of the warning region.

For example, as shown in FIG. 6 (*b*), an example in which the arm of robot 30 revolves to the right from a position a in the monitored region is assumed. In this example, operation control device 100 outputs a stop signal to drive control device 50 when the arm reaches a position b which is immediately before the arm moves out of the warning region. Drive control device 50 can thus brake and stop robot 30 when the stop signal is input from operation control device 100 and can brake and stop robot 30 at a position c within the monitored region without cutting off supply of electric power to servo amplifier 61.

[Internal Configuration of Operation Control Device]

An internal configuration of operation control device 100 will now be described again with reference to FIG. 3. Operation control device 100 can communicate with personal computer 11 through a communication unit for setting 101. An operator can start up an application for a setting tool on personal computer 11 and can make various types of setting through the setting tool.

For example, when the operator inputs data for setting an operation region on personal computer 11 (for example, values for X and Y of each vertex shown in FIG. 4), communication unit for setting 101 receives a signal indicating the set operation region from personal computer 11. Communication unit for setting 101 outputs the signal received from personal computer 11 to an operation region setting unit 116. Operation region setting unit 116 sets an operation region detected based on the signal received from communication unit for setting 101 as an operation region to be monitored. Then, operation region setting unit 116 outputs a signal indicating the operation region to be monitored to an activation unit 112. Activation unit 112 detects the operation region to be monitored, based on the signal received from operation region setting unit 116.

When the operator inputs data for setting a warning region on personal computer 11, communication unit for setting 101 receives a signal indicating the set warning region from personal computer 11. Communication unit for setting 101 outputs the signal received from personal computer 11 to a warning region setting unit 113. Warning region setting unit 113 sets the warning region detected based on the signal received from communication unit for setting 101 as a warning region to be monitored. Then, warning region setting unit 113 outputs a signal indicating the warning region to be monitored to activation unit 112. Activation unit 112 detects the warning region to be monitored, based on the signal received from warning region setting unit 113. Warning region setting unit 113 corresponds to one embodiment of the "warning region setting unit."

The operator can associate each switch such as start switch 12 and loading start switches 13 and 14 with an operation region to be monitored. For example, in the present embodiment, start switch 12 corresponds to operation region 0, loading start switch 13 corresponds to operation region 1, and loading start switch 14 corresponds to operation region 2.

When the operator inputs data for setting an operation region to be associated with each switch on personal computer 11, communication unit for setting 101 receives a signal indicating an operation region associated with each switch from personal computer 11. Communication unit for setting 101 outputs the signal received from personal computer 11 to a monitoring setting unit 111. Monitoring setting unit 111 sets the operation region associated with each switch based on a signal received from communication unit for setting 101. Then, monitoring setting unit 111 outputs a signal indicating contents of setting to activation unit 112. Activation unit 112 detects the operation region associated with each switch based on the signal received from monitoring setting unit 111. Monitoring setting unit 111 corresponds to one embodiment of the "region activation setting unit."

Furthermore, the operator can set a light curtain to be activated and a light curtain to be deactivated among light curtains 21 to 25, in accordance with the activated operation region among the plurality of operation regions.

For example, in the present embodiment, when operation region 0 is activated and set as monitored region 0, light curtain 21 and light curtain 22 are deactivated whereas light curtain 23, light curtain 24, and light curtain 25 are activated. When operation region 1 is activated and set as monitored region 1, light curtain 22 and light curtain 23 are deactivated whereas light curtain 21, light curtain 24, and light curtain 25 are activated. When operation region 2 is activated and set as monitored region 2, light curtain 21 and light curtain 24 are deactivated whereas light curtain 22, light curtain 23, and light curtain 25 are activated. When operation region 3 is activated and set as monitored region 3, light curtain 23 and light curtain 24 are deactivated whereas light curtain 21, light curtain 22, and light curtain 25 are activated.

When the operator inputs data for setting a light curtain to be activated or deactivated on personal computer 11, communication unit for setting 101 receives a signal indicating setting for activation or deactivation of each of light curtains 21 to 25 from personal computer 11. Communication unit for setting 101 outputs the signal received from personal computer 11 to monitoring setting unit 111. Monitoring setting unit 111 activates or deactivates each of light curtains 21 to 25 in association with the operation region based on the signal received from communication unit for setting 101. Then, monitoring setting unit 111 outputs a signal indicating contents of setting to activation unit 112. Activation unit 112 detects a state of setting of activation or deactivation of each of light curtains 21 to 25 based on the signal received from monitoring setting unit 111. Monitoring setting unit 111 corresponds to one embodiment of the "detection activation setting unit."

Each of light curtains 21 to 25 is connected to a protection stop signal input unit 102. When entry by an operator from the outside is detected by each of light curtains 21 to 25, protection stop signal input unit 102 receives from the light curtain, a signal indicating cut-off of light by the operator as a protection stop signal. Protection stop signal input unit 102 outputs the protection stop signal received from each of light curtains 21 to 25 to an operation control unit 110. Operation control unit 110 detects the light curtain which has detected entry from the outside, based on the protection stop signal received from protection stop signal input unit 102. When operation control unit 110 detects the light curtain which has detected entry from the outside, it outputs a signal instructing electromagnetic switch 62 to turn off to electromagnetic switch 62 through a servo on output unit 108 which will be described later. Operation control unit 110 corresponds to one embodiment of the "operation control unit."

A reset signal input unit 103 is connected to start switch 12. When the operator operates start switch 12, reset signal input unit 103 receives from start switch 12, a signal generated by operation of start switch 12 as a reset signal. Reset signal input unit 103 outputs the reset signal received from start switch 12 to activation unit 112. Activation unit 112 detects start switch 12 having been operated, based on the reset signal received from reset signal input unit 103. Then, activation unit 112 detects an operation region associated with operated start switch 12. Then, activation unit 112 activates the detected operation region and sets the operation region as the monitored region. In the present embodiment, when the reset signal is input, activation unit 112 activates operation region 0 and sets the operation region as monitored region 0.

A monitoring start signal input unit 104 is connected to loading start switches 13 and 14. When the operator operates loading start switch 13, 14, monitoring start signal input unit 104 receives from loading start switch 13, 14, a signal generated by operation of loading start switch 13, 14 as a monitoring start signal. Monitoring start signal input unit 104 outputs the monitoring start signal received from loading start switch 13, 14 to activation unit 112. Activation unit 112 detects loading start switch 13, 14 having been operated, based on the monitoring start signal received from monitoring start signal input unit 104. Then, activation unit 112 detects an operation region associated with operated loading start switch 13, 14. Furthermore, activation unit 112 activates the detected operation region and sets the operation region as the monitored region. In the present embodiment, when the monitoring start signal indicating that loading start switch 13 has been operated is input, activation unit 112 activates operation region 1 and sets the operation region as monitored region 1. When the monitoring start signal indicating that loading start switch 14 has been operated is input, activation unit 112 activates operation region 2 and sets the operation region as monitored region 2.

When activation unit 112 activates an operation region and sets the operation region as the monitored region, it outputs a signal indicating the monitored region to operation control unit 110. Activation unit 112 corresponds to one embodiment of the "activation unit." Operation control unit 110 detects the operation region set as the monitored region based on the signal received from activation unit 112 and restricts operations by robot 30 within the detected monitored region.

A position signal input unit 105 is connected to encoder 70 provided in each shaft of robot 30. Position signal input unit 105 receives a signal transmitted from encoder 70 to drive control device 50 as a position signal. Position signal input unit 105 outputs the position signal received from encoder 70 to operation control unit 110. Operation control unit 110 calculates a direction of rotation and an angle of rotation of each shaft based on the position signal received from position signal input unit 105 and restricts operations by robot 30 based on the calculated direction of rotation and angle of rotation of each shaft.

A monitoring cancellation signal input unit 106 is connected to drive control device 50. When loading operations by robot 30 are completed under the control by drive control device 50, monitoring cancellation signal input unit 106 receives a signal indicating completion of the operations in the monitored region as a monitoring cancellation signal from drive control device 50. Monitoring cancellation signal input unit 106 outputs the monitoring cancellation signal received from drive control device 50 to a deactivation unit 115. Deactivation unit 115 detects completion of the loading operations based on the monitoring cancellation signal and detects a monitored region in which the operations have been completed. Then, deactivation unit 115 deactivates the detected monitored region and cancels a monitored state. Furthermore, deactivation unit 115 outputs a signal indicating an operation region of which monitored state has been canceled to operation control unit 110. Operation control unit 110 detects an operation region of which monitored state has been canceled based on the signal received from deactivation unit 115.

When the loading operations by robot 30 are completed, drive control device 50 turns on or blinks loading completion indicator 15, 16. For example, when operations for loading onto the first pallet within the range of monitored region 1 have been completed, drive control device 50 turns on or blinks loading completion indicator 15, and when operations for loading onto the second pallet within the range of monitored region 2 have been completed, the drive control device turns on or blinks loading completion indicator 16.

A status communication unit 107 is connected to drive control device 50. Status communication unit 107 receives a signal indicating a state relating to control by operation control unit 110 (for example, setting of a monitored region and a warning region) from operation control unit 110. Status communication unit 107 detects a set monitored region and warning region based on a signal received from operation control unit 110 and outputs the signal indicating the detected monitored region and warning region to drive control device 50. Drive control device 50 has robot 30 operate within a range of the monitored region and the warning region based on the signal received from status communication unit 107. For example, when monitored region 1 is set, drive control device 50 has loading operations performed within the range of monitored region 1.

When robot 30 moves out of the warning region, status communication unit 107 receives a stop signal for having drive control device 50 brake and stop robot 30 from operation control unit 110. Status communication unit 107 outputs the stop signal received from operation control unit 110 to drive control device 50. When drive control device 50 receives the stop signal from status communication unit 107, it controls servo amplifier 61 to have motor 71 braked and stopped. Robot 30 is thus braked and stopped within the monitored region without cut-off of supply of electric power to servo amplifier 61.

Servo on output unit 108 is connected to electromagnetic switch 62. Servo on output unit 108 receives a signal for turning on or off electromagnetic switch 62 from operation control unit 110. Servo on output unit 108 outputs a signal received from operation control unit 110 to electromagnetic switch 62. For example, operation control unit 110 predicts at prescribed periodic intervals, a position of robot 30 which may move through inertia when supply of electric power to servo amplifier 61 is cut off while robot 30 is operating. Then, operation control unit 110 predicts whether or not robot 30 will move out of the monitored region as the robot moves through inertia. When operation control unit 110 predicts that robot 30 will move out of the monitored region as the robot moves through inertia, it outputs a signal instructing electromagnetic switch 62 to turn off to electromagnetic switch 62 through servo on output unit 108. Electric power from motive power source 60 is thus no longer supplied to servo amplifier 61 and operations by robot 30 are gradually stopped.

A brake signal output unit 109 is connected to brake 72. Brake signal output unit 109 receives a signal indicating turn-on or -off of brake 72 from operation control unit 110. Brake signal output unit 109 outputs the signal received from operation control unit 110 as a brake signal to brake 72. For example, when rotation of each shaft of robot 30 is stopped, operation control unit 110 outputs a brake signal indicating turn-off of brake 72 to brake 72 through brake signal output unit 109. Each shaft is thus braked by brake 72 while motor 71 remains stopped.

[Loading Operation]

Figure 8:
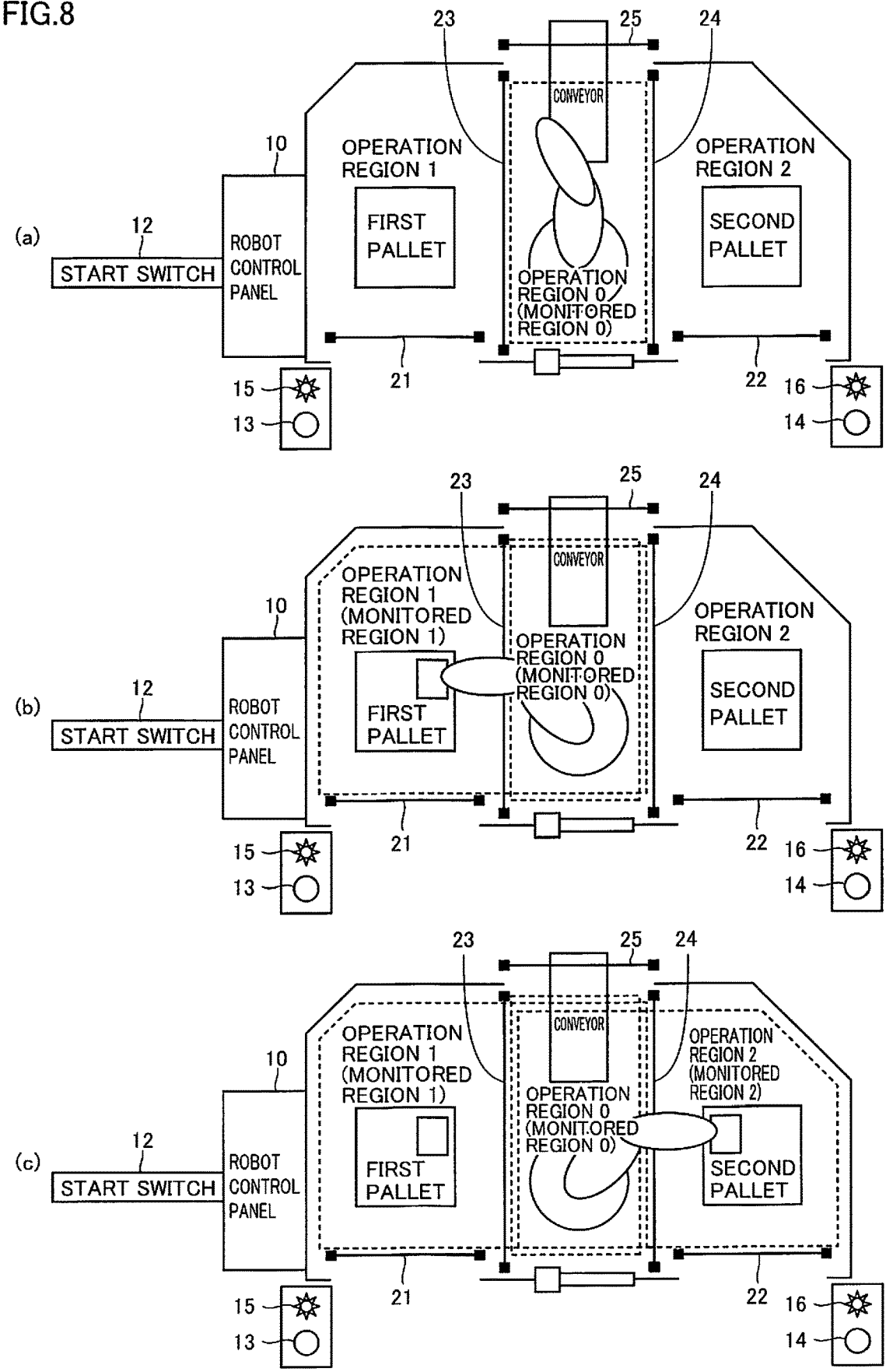
FIG. 8 is (a) a diagram showing loading operations by the robot within a range of a monitored region 0, (b) a diagram showing loading operations by the robot within a range of a combined region of monitored region 0 and a monitored region 1, and (c) a diagram showing loading operations by the robot within a range of a combined region of monitored region 0, monitored region 1, and a monitored region 2.
Figure 9:
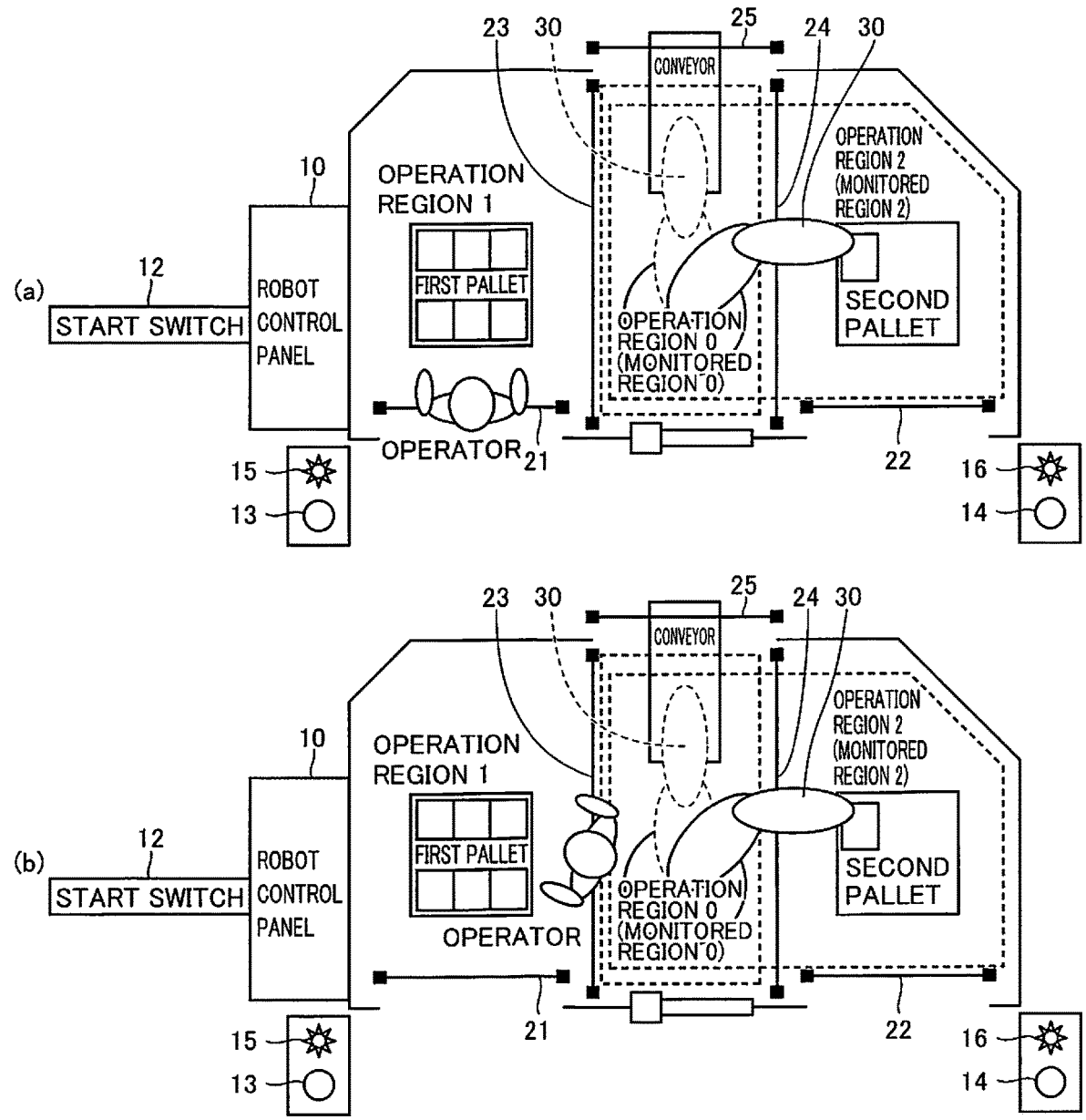
FIG. 9 is (a) a diagram showing entry of an operator into the outside of a range of a combined region of monitored region 0 and monitored region 2 and (b) a diagram showing entry of the operator into the range of the combined region of monitored region 0 and monitored region 2.

One example of loading operations by using operation control system 1 configured as above will now be described with reference to FIGS. 8 and 9. An operation mode of robot 30 includes an automatic mode in which robot 30 automatically performs loading operations, a manual mode in which an operator manually moves robot 30 to have loading operations performed, and a teach mode in which robot 30 is taught operations in order for robot 30 to automatically perform loading operations. FIGS. 8 and 9 show operations by robot 30 in the automatic mode.

Initially, when power of operation control device 100 is turned on, robot 30 moves to an encoder check position in operation region 0 under the control by drive control device 50. Robot 30 corrects to the origin, a position of a disc for detection of each encoder at the encoder check position.

As shown in FIG. 8 (*a*), when the operator operates start switch 12, only operation region 0 is activated and set as monitored region 0. Since monitored region 0 has been set, light curtain 21 and light curtain 22 are deactivated whereas light curtain 23, light curtain 24, and light curtain 25 are activated. When any of light curtain 23, light curtain 24, and light curtain 25 detects entry into monitored region 0 by an operator, operation control device 100 cuts off supply of electric power to servo amplifier 61.

As shown in FIG. 8 (*b*), when the operator operates loading start switch 13, operation region 1 is newly activated and set as monitored region 1. Monitored region 0 and monitored region 1 are monitored by operation control device 100. Drive control device 50 has loading operations onto the first pallet performed within a range of a combined region of monitored region 0 and monitored region 1. Then, operation control device 100 restricts operations by robot 30 such that robot 30 operates within the range of the combined region of monitored region 0 and monitored region 1. Specifically, when operation control device 100 predicts that a range of operations by robot 30 will be included in any of monitored region 0 and monitored region 1 as the robot moves through inertia when supply of electric power to servo amplifier 61 is cut off, it does not cut off supply of electric power to servo amplifier 61, whereas when it predicts that a range of operations by robot 30 will be included in neither of monitored region 0 and monitored region 1, it cuts off supply of electric power to servo amplifier 61 and has operations by robot 30 stopped.

For example, when only monitored region 0 is set as shown in FIG. 8 (*a*), operation control device 100 does not cut off supply of electric power to servo amplifier 61 while robot 30 is operating within a range of monitored region 0. When operation control device 100 predicts that robot 30 will move out of monitored region 0, it cuts off supply of electric power to servo amplifier 61. When monitored region 1 is set as shown in FIG. 8 (*b*) in spite of prediction by operation control device 100 that robot 30 will move out of the range of monitored region 0, however, a range of operations by robot 30 is included in monitored region 1. In this case, operation control device 100 does not cut off supply of electric power to servo amplifier 61.

Since monitored region 1 in addition to monitored region 0 has been set, light curtain 23 is newly deactivated and light curtain 21 is activated. When any of light curtain 21, light curtain 24, and light curtain 25 detects entry into the monitored region by an operator, operation control device 100 cuts off supply of electric power to servo amplifier 61. Since light curtain 23 has been deactivated, operation control device 100 does not cut off supply of electric power to servo amplifier 61 even though robot 30 passes through light curtain 23.

When the operator operates loading start switch 14 as shown in FIG. 8 (*c*), operation region 2 is newly activated and set as monitored region 2. Monitored region 0, monitored region 1, and monitored region 2 are monitored by operation control device 100. Drive control device 50 has operations for loading onto the first pallet and the second pallet performed within a range of a combined region of monitored region 0, monitored region 1, and monitored region 2. Then, operation control device 100 restricts operations by robot 30 such that robot 30 operates within the range of the combined region of monitored region 0, monitored region 1, and monitored region 2. Specifically, when operation control device 100 predicts that a range of operations by robot 30 will be included in any of monitored region 0, monitored region 1, and monitored region 2 as the robot moves through inertia when supply of electric power to servo amplifier 61 is cut off, it does not cut off supply of electric power to servo amplifier 61, whereas when it predicts that a range of operations by robot 30 will be included in none of monitored region 0, monitored region 1, and monitored region 2, it cuts off supply of electric power to servo amplifier 61 and has operations by robot 30 stopped.

Since monitored region 2 in addition to monitored region 0 and monitored region 1 has been set, light curtain 24 is newly deactivated and light curtain 22 is activated. When any of light curtain 21, light curtain 22, and light curtain 25 detects entry into the monitored region by the operator, operation control device 100 cuts off supply of electric power to servo amplifier 61. Since light curtain 23 and light curtain 24 have been deactivated, operation control device 100 does not cut off supply of electric power to servo amplifier 61 even though robot 30 passes through light curtain 23 and light curtain 24.

When operations for loading onto the first pallet are completed as shown in FIG. 9 (a), drive control device 50 turns on or blinks loading completion indicator 15. Then, operation control device 100 deactivates monitored region 1 and cancels the monitored state. Since monitored region 1 has been deactivated, light curtain 21 is deactivated. Therefore, the operator can enter the first station through light curtain 21 and can carry the first pallet onto which loading operations have been completed to the outside.

Since monitored region 1 has been deactivated as shown in FIG. 9 (b), light curtain 23 is activated. Therefore, when the operator inadvertently passes through light curtain 23, operation control device 100 cuts off supply of electric power to servo amplifier 61.

Thus, a prescribed operation region among a plurality of operation regions is activated depending on contents of operations, and classification into a light curtain to be activated and a light curtain to be deactivated is made depending on which operation region has been activated. Since operation control device 100 restricts operations by the robot within the monitored region, the operator can safely proceed with operations outside the monitored region. By adding operation control device 100 as being externally attached to drive control device 50, interlocking between robot 30 and an operator is established.

[Processing in Operation Control Device]

Figure 10:
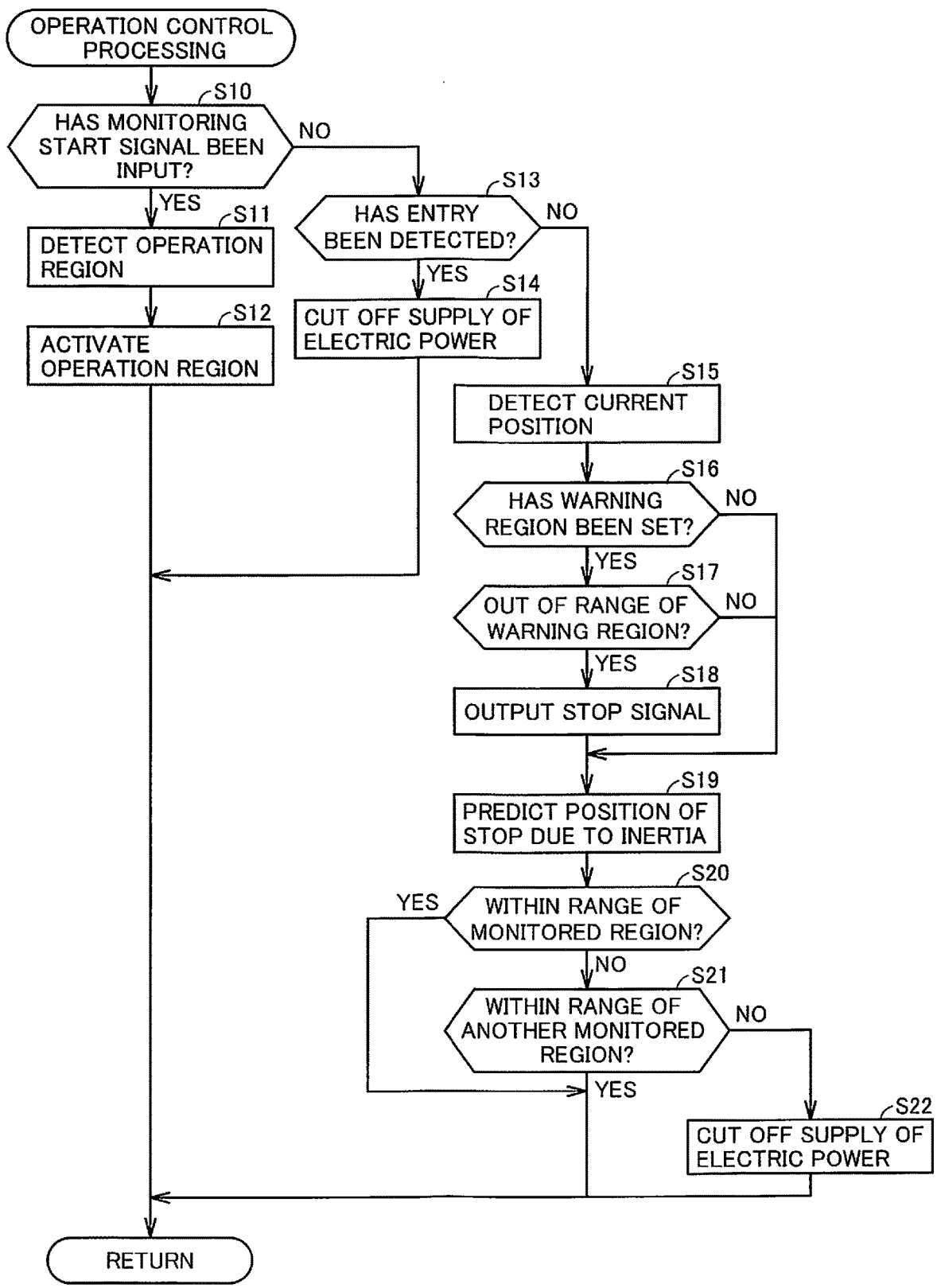
FIG. 10 is a flowchart showing one example of operation control processing performed by an operation control device.

Specific processing in operation control device 100 will now be described with reference to a flow in FIG. 10. FIG. 10 is a flowchart showing one example of operation control processing performed by operation control device 100. Operation control processing shown in FIG. 10 is performed by each processing unit in operation control device 100 at prescribed periodic intervals (for example, at 10-msec. intervals).

Operation control device 100 determines whether or not a monitoring start signal has been input as a result of operation of loading start switch 13, 14 by an operator (S10). When the monitoring start signal has been input (YES in S10), operation control device 100 detects an operation region associated with operated loading start switch 13, 14 (S11). Operation control device 100 activates the detected operation region and sets the operation region as the monitored region (S12). Operation control device 100 activates or deactivates a light curtain in accordance with the monitored region. Thereafter, operation control device 100 quits the present routine.

When the monitoring start signal has not been input (NO in S10), operation control device 100 determines whether or not the activated light curtain has detected entry by the operator from the outside (S13). When the light curtain detects entry by the operator from the outside (YES in S13), operation control device 100 cuts off supply of electric power to servo amplifier 61 and has operations by robot 30 stopped (S14). Thereafter, operation control device 100 quits the present routine.

When the light curtain has not detected entry from the outside (NO in S13), operation control device 100 detects a current position of robot 30 based on a direction of rotation and an angle of rotation of each shaft detected by encoder 70 (S15).

Operation control device 100 determines whether or not a warning region has been set (S16). When no warning region has been set (NO in S16), the process makes transition to S19. When a warning region has been set (YES in S16), operation control device 100 determines whether or not robot 30 is located out of the warning region based on the current position of robot 30 detected in the processing in S15 (S17).

When operation control device 100 determines that robot 30 is located within the warning region (NO in S17), the process makes transition to S19. When it is determined that robot 30 is located out of the warning region (YES in S17), a stop signal is output to drive control device 50 (S18).

In the processing in S19, operation control device 100 predicts a stop position of robot 30 which may move through inertial rotation of each shaft when it cuts off supply of electric power to servo amplifier 61 (S19).

Operation control device 100 determines whether or not a predicted position of robot 30 is within a range of one monitored region (S20). When the predicted position of robot 30 is not within the range of one monitored region, that is, when robot 30 moves out of the range of one monitored region as it moves through inertia (NO in S20), the operation control device determines whether or not the predicted position of robot 30 is within a range of another monitored region (S21). When the predicted position of robot 30 is not within the range of another monitored region, that is, robot 30 moves out of the range of another monitored region as it moves through inertia (NO in S21), operation control device 100 cuts off supply of electric power to servo amplifier 61 and has operations by robot 30 stopped (S22). Thereafter, operation control device 100 quits the present routine.

When the predicted position of robot 30 is within a range of any monitored region (YES in S20 or YES in S21), operation control device 100 quits the present routine without cutting off supply of electric power to servo amplifier 61.

As set forth above, operations by robot 30 are restricted such that robot 30 operates within at least one of a plurality of operation regions. For example, robot 30 can operate also within a plurality of operation regions such as operation region 0, operation region 1, and operation region 2 as shown in FIG. 8 (c), without being limited to operation region 0 alone as shown in FIG. 8 (a). Therefore, operations can proceed efficiently by using robot 30. Furthermore, while a plurality of operation regions such as operation region 0 and operation region 1 are activated and set as the monitored regions as shown in FIG. 8 (b), when it is predicted that a range of operations by robot 30 will be included in any of operation region 1 and operation region 2, supply of electric power to servo amplifier 61 is not cut off, whereas when it is predicted that a range of operations by robot 30 will be included in neither of operation region 1 and operation region 2, supply of electric power to servo amplifier 61 is cut off. Therefore, the operator can safely proceed with operations outside a range of the combined region of monitored region 0 and monitored region 1. Efficiency in operations by robot 30 can thus be improved while safety is ensured.

When at least one of a plurality of operation regions is set as the monitored region, an overlapping region between the plurality of operation regions is also set as the monitored region. For example, in the conveyor region where operation region 1 and operation region 2 overlap each other, when at least one of operation region 1 and operation region 2 is set as the monitored region, the conveyor region is also set as the monitored region and supply of electric power to servo amplifier 61 is not cut off. Therefore, for example, such a disadvantage that, in spite of operation region 1 being monitored, due to operation region 2 overlapping with operation region 1 not being monitored, an overlapping region therebetween is not set as the monitored region and supply of electric power to servo amplifier 61 is cut off is not caused.

When it is predicted that robot 30 will move out of the monitored region as the robot moves through inertia when supply of electric power to servo amplifier 61 is cut off, supply of electric power to servo amplifier 61 is cut off. Therefore, in consideration of movement of robot 30 through inertia when supply of electric power to servo amplifier 61 is cut off, robot 30 does not move out of the monitored region. Therefore, the operator can safely proceed with operations outside the monitored region.

Determination as to whether or not a predicted position of robot 30 is outside the monitored region is made based on intersection determination of a line segment. Therefore, a result of determination can be obtained faster than in making determination through complicated processing such as image processing with the use of a camera.

When robot 30 moves out of the warning region, a stop signal is output from operation control device 100 to drive control device 50. Thus, robot 30 is braked and stopped under the control of servo amplifier 61 by drive control device 50 before supply of electric power to servo amplifier 61 is cut off by operation control device 100. Therefore, cut-off of electric power to servo amplifier 61 by operation control device 100 can be avoided in advance.

When entry from the outside by an operator into a monitored region through an activated light curtain occurs, operation control device 100 cuts off supply of electric power to servo amplifier 61. Therefore, for example, even when the operator enters the monitored region, exposure of the operator to danger posed by robot 30 can be avoided.

As shown in FIG. 8, light curtain 23 is provided in a boundary portion between operation region 0 and operation region 1 and a boundary portion between operation region 1 and operation region 2. Light curtain 24 is provided in a boundary portion between operation region 0 and operation region 2 and a boundary portion between operation region 1 and operation region 2. Light curtains 23 and 24 are thus provided in boundary portions where a plurality of operation regions overlap each other. Light curtains 23 and 24 do not detect entry from the outside by an arm so long as both of the plurality of operation regions are set as monitored regions. Thus, such a disadvantage as cut-off of supply of electric power to servo amplifier 61 due to detection by light curtains 23 and 24 of entry by the arm from one monitored region into the other monitored region in spite of both of the plurality of operation regions having been set as the monitored regions is not caused.

A plurality of light curtains are associated with a plurality of operation regions, respectively, and the operator can set on personal computer 11, a light curtain to be activated and a light curtain to be deactivated. Thus, detection by a desired light curtain of entry into the monitored region from the outside can be activated or deactivated.

Start switch 12 and loading start switches 13 and 14 can be associated with any operation regions by the operator through personal computer 11. Since the switches are thus associated with a plurality of operation regions to be activated, the operator can activate a desired operation region simply by changing a switch which the operator operates in accordance with contents of operations so that robot 30 can operate within that operation region.

The operator can set in advance on a personal computer, all of association of each switch with an operation region to be activated, activation of an operation region corresponding to a switch when the switch is operated, activation or deactivation of a light curtain in accordance with a monitored region, and deactivation of a monitored region at the time of completion of loading operations. Therefore, programming by using a special control device such as a safety PLC is not necessary.

Modification

Though a primary embodiment in the present invention has been described above, the present invention is not limited to the embodiment above.

In the present embodiment, a plurality of operation regions overlap each other, however, limitation thereto is not intended. For example, a plurality of operation regions may be adjacent to each other without including an overlapping region. If a plurality of operation regions are adjacent to each other without including an overlapping region, operation control device 100 may operate as below. When operation control device 100 predicts that a range of operations by robot 30 is included in a range of any of a plurality of adjacent operation regions, it does not cut off supply of electric power to servo amplifier 61, whereas when it predicts that a range of operations by robot 30 is not included in a range of any of a plurality of adjacent operation regions, it cuts off supply of electric power to servo amplifier 61. For example, an example in which monitored region 1 and monitored region 2 shown in FIG. 8 (b) are adjacent to each other without overlapping each other is assumed. When operation control device 100 predicts that robot 30 moves out of a range of monitored region 0 to monitored region 1, in spite of setting of monitored region 1, it may cut off supply of electric power to servo amplifier 61 because a range of operations by robot 30 is not included in the range of monitored region 0.

Without being limited to the example above, when a plurality of operation regions are adjacent to each other without including an overlapping region, operation control device 100 may operate as below. When operation control device 100 predicts that robot 30 will be included in a range of any of a plurality of adjacent operation regions, it does not cut off supply of electric power to servo amplifier 61, whereas when it predicts that robot 30 will not be included in a range of any of the plurality of adjacent operation regions, it may cut off supply of electric power to servo amplifier 61. For example, an example in which monitored region 1 and monitored region 2 shown in FIG. 8 (b) are adjacent to each other without overlapping each other is assumed. When operation control device 100 predicts that robot 30 will move out of the range of monitored region 0 to monitored region 1 and when monitored region 1 is set and robot 30 is included in the range of monitored region 1 after a prediction operation, the operation control device does not cut off supply of electric power to servo amplifier 61. When operation control device 100 predicts that robot 30 will move out of the range of monitored region 0 to monitored region 1 and unless robot 30 is included in the range of monitored region 1 after a prediction operation in spite of monitored region 1 having been set, it may cut off supply of electric power to servo amplifier 61.

Though an operation region where operations by robot 30 are permitted can be set by an operator in the present embodiment, the operator may be permitted to set a prohibited region where entry by robot 30 is prohibited. For example, when an operator enters a command for setting a prohibited region through personal computer 11, a prohibited region setting unit (which is not shown) of operation control device 100 sets a prohibited region. When operation control unit 110 predicts that robot 30 will enter the prohibited region as it moves through inertia when supply of electric power to servo amplifier 61 is cut off, the operation control device may cut off supply of electric power to servo amplifier 61.

The prohibited region may automatically be set by operation control device 100 instead of being set by an operator. For example, in the example of the present embodiment shown in FIG. 4, the operation region has to be set to include the R axis of robot 30. If the operator sets an operation region without including the R axis of robot 30, the set operation region may automatically be changed to the prohibited region by operation control device 100.

By thus providing a prohibited region, the movable apparatus does not enter the set prohibited region so that the operator can safely proceed with operations in the prohibited region.

Though the operator is permitted to set an operation region in a direction in parallel to the installation surface in the present embodiment, limitation thereto is not intended. For example, the operator may be permitted to set an operation region in a direction perpendicular to the installation surface. Furthermore, operation control device 100 may determine whether or not each feature of robot 30 is within a prescribed operation region as the robot moves through inertia when supply of electric power to servo amplifier 61 is cut off.

Specifically, operation control device 100 predicts a position where robot 30 will be located highest (for example, an upper limit point shown in FIG. 2) and a position of a bottom of end effector 44 of robot 30 (for example, a lower limit point shown in FIG. 2) and determines whether or not the upper limit point and the lower limit point are located within a monitored region in a vertical direction. When operation control device 100 predicts that the upper limit point and the lower limit point will be out of the monitored region in the vertical direction as a result of determination, it may cut off supply of electric power to servo amplifier 61.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 operation control system; 10 robot control panel; 11 personal computer; 12 start switch; 13, 14 loading start switch; 21 to 25 light curtain; 30 robot; 50 drive control device; 60 motive power source; 61 servo amplifier; 62 electromagnetic switch; 71 motor; 100 operation control device; 110 operation control unit; 112 activation unit; and 113 warning region setting unit

The invention claimed is:

1. An operation control device for a movable apparatus to be driven by a drive apparatus controlled by a drive control device, the operation control device comprising:
an activation unit configured to activate at least one of a plurality of operation regions in which the movable apparatus can operate;
an operation control unit configured to restrict operations by the movable apparatus such that the movable apparatus operates within an activated region which is an operation region activated by the activation unit
the operation control unit being configured, when a first operation region and a second operation region included in the plurality of operation regions have been activated by the activation unit,
i) not to cut off supply of electric power to the drive apparatus when the operation control unit predicts that the movable apparatus will be included in a range of any of the first operation region and the second operation region, and
ii) to cut off supply of electric power to the drive apparatus when the operation control unit predicts that the movable apparatus will be included in a range of neither of the first operation region and the second operation region; and
an entry detection unit configured to detect entry into the activated region from outside,
wherein when the entry detection unit detects the entry, the operation control unit is configured to cut off supply of electric power to the drive apparatus, and
wherein the entry detection unit is provided in a boundary portion between the first operation region and the second operation region, and the entry detection unit is configured not to detect the entry when the first operation region and the second operation region are set as the activated regions.

2. The operation control device according to claim 1, wherein
the first operation region and the second operation region overlap each other, and
when at least one of the first operation region and the second operation region is set as the activated region, an overlapping region between the first operation region and the second operation region is also set as the activated region.

3. The operation control device according to claim 1, wherein
when the operation control unit predicts that the movable apparatus will move out of a range of the activated region while the movable apparatus moves through inertia due to cut-off of supply of electric power to the drive apparatus, the operation control unit is configured to cut off supply of electric power to the drive apparatus.

4. The operation control device according to claim 1, further comprising a warning region setting unit configured to set a prescribed warning region within a range of the activated region, wherein
when the movable apparatus moves out of a range of the warning region, the operation control unit is configured to have the drive control device control the drive apparatus by outputting a stop signal to the drive control device so as to stop the movable apparatus.

5. The operation control device according to claim 1, further comprising:
a plurality of entry detection units, one of the plurality of entry detection units being associated with respective one of the plurality of operation regions; and
a detection activation setting unit configured to set an entry detection unit by which detection of entry into the activated region from the outside is activated and an entry detection unit by which detection of entry into the activated region from the outside is deactivated, among the plurality of entry detection units.

6. The operation control device according to claim 1, further comprising a region activation setting unit configured to activate a plurality of operation regions, one of the plurality of operations regions being associated with respective one of a plurality of switches.

7. The operation control device according to claim 1, further comprising a prohibited region setting unit configured to set a prohibited region into which entry by the movable apparatus is prohibited, wherein
when the operation control unit predicts that the movable apparatus will enter a range of the prohibited region while the movable apparatus moves through inertia due to cut-off of supply of electric power to the drive apparatus, the operation control unit is configured to cut off supply of electric power to the drive apparatus.

8. An operation control system comprising:
the movable apparatus;
the drive control device; and
the operation control device according to claim 1.

9. A method of controlling operations by a movable apparatus to be driven by a drive apparatus controlled by a drive control device, the method comprising:
an activation step of activating at least one of a plurality of operation regions in which the movable apparatus can operate;
an operation control step of restricting operations by the movable apparatus such that the movable apparatus operates within an activated region which is an operation region activated in the activation step
the operation control step including, when a first operation region and a second operation region included in the plurality of operation regions have been activated in the activation step,
i) a step of not cutting off supply of electric power to the drive apparatus when it is predicted that the movable apparatus will be included in a range of any of the first operation region and the second operation region, and
ii) a step of cutting off supply of electric power to the drive apparatus when it is predicted that the movable apparatus will be included in a range of neither of the first operation region and the second operation region; and
an entry detection step of detecting entry into the activated region from outside when the first operation region and the second operation region are not set as the activated regions,
wherein when the entry detection step detects the entry, the operation control step cuts off supply of electric power to the drive apparatus, and
wherein the entry detection step does not detect the entry when the first operation region and the second operation region are set as the activated regions.

10. An operation control device for a movable apparatus to be driven by a drive apparatus controlled by a drive control device, the operation control device comprising:
an activation unit configured to activate an operation region in which the movable apparatus can operate;
an operation control unit configured to restrict operations by the movable apparatus such that the movable apparatus operates within a warning region within a range of the activated region,
the operation control unit being configured to monitor both the activated region and the warning region, and,
i) not to cut off supply of electric power to the drive apparatus when the operation control unit predicts that the movable apparatus will be included in a range of the activated region, and
ii) to cut off supply of electric power to the drive apparatus when the operation control unit predicts that the movable apparatus will not be included in a range of the activated region,
wherein when the movable apparatus moves out of a range of the warning region toward the activated region, the operation control unit is configured to have the drive control device control the drive apparatus by outputting a stop signal to the drive control device so as to stop the movable apparatus.

11. A method of controlling operations by a movable apparatus to be driven by a drive apparatus controlled by a drive control device, the method comprising:
an activation step of activating an operation region in which the movable apparatus can operate;
an operation control step of restricting operations by the movable apparatus such that the movable apparatus operates within an activated region which is the operation region activated in the activation step; and
a warning region setting step of setting a prescribed warning region within a range of the activated region,
the operation control step including monitoring both the activated region and the warning region and,
i) a step of not cutting off supply of electric power to the drive apparatus when it is predicted that the movable apparatus will be included in a range of the activated region, and
ii) a step of cutting off supply of electric power to the drive apparatus when it is predicted that the movable apparatus will not be included in a range of the activated region,
wherein when the movable apparatus moves out of a range of the warning region toward the activated region, the operation control step has the drive control device control the drive apparatus by outputting a stop signal to the drive control device so as to stop the movable apparatus.

* * * * *